(No Model.)
C. J. REYNOLDS.
WHEEL.
No. 439,188. Patented Oct. 28, 1890.
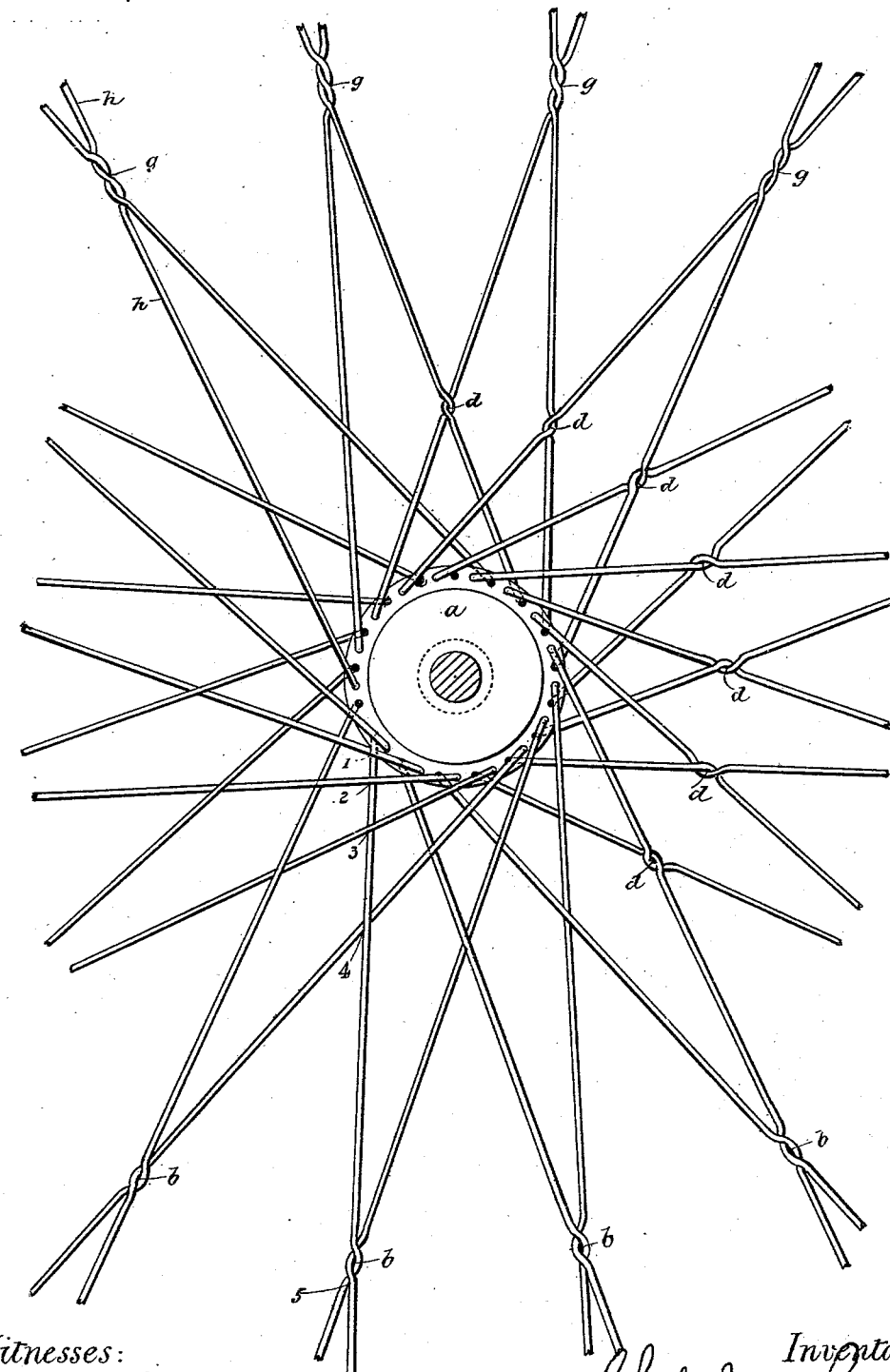
Witnesses:
Howard S. White.
H. de Vos.
Inventor:
Charles James Reynolds.
By Richards
Attorneys

UNITED STATES PATENT OFFICE.

CHARLES JAMES REYNOLDS, OF MAIDENHEAD, ENGLAND.

WHEEL.

SPECIFICATION forming part of Letters Patent No. 439,188, dated October 28, 1890.

Application filed September 25, 1889. Serial No. 325,035. (No model.) Patented in England March 4, 1889, No. 3,775, and in Canada October 24, 1889, No. 51,092.

*To all whom it may concern:*

Be it known that I, CHARLES JAMES REYNOLDS, a subject of the Queen of Great Britain and Ireland, residing at the town of Maidenhead, county of Berks, England, have invented certain new and useful Improvements in Wheels for Velocipedes and other Vehicles, (patented in Great Britain March 4, 1889, No. 3,775, and in Canada October 24, 1889, No. 51,092;) and I do hereby declare that the following is a full, clear, and exact description of the invention, which will enable others skilled in the art to which it appertains to make and use the same.

My improvements relate to those wheels which are known as "tangent" or "laced" wheels, in which the spokes are not radial from the hub to the circumference, but lie at a tangent or at an acute angle to the circle formed by the periphery of the hub of the wheel. In such wheels, known in the trade as "tangent" or "laced" wheels, the spokes in passing from the nave or hub to the circumference cross each other.

The object of my invention is to provide a secure and simple mode of fastening the spokes together at the points where they thus cross, and it will be readily understood by reference to the accompanying drawing, in which the figure represents one side of the hub of a laced or tangent wheel, the spokes being shown placed at such an angle to the circle formed by the periphery of the hub that each spoke is crossed by five others on its way from the hub to the rim or tire of the wheels, as indicated by the numbers 1, 2, 3, 4, 5. It is to be understood that the number of such points of crossing will vary in my wheel according to the number of spokes and the angle at which they are inserted in the hub. To make such a wheel thoroughly rigid, it is necessary that the spokes at some or all of such points of crossing shall be firmly fastened together. Various means have been employed for doing this, such as by special clips, or by soldering the points of contact, or by tying the same with wire, the joint being afterward in some instances soldered as well; but all these fastenings are liable to work loose in time, and are unsatisfactory for other reasons. In my improved wheel I effect the due fastening of the spokes by twisting them together at the point of crossing, either at all the points or at several of them, or (and this is the plan I prefer) by twisting them only at the outer circle of crossings. I accomplish this either by a single half-twist, as shown at *b*, or by a whole twist, as shown at *g*, or by a combination of any number of whole or half twists that may be desired; but I prefer that the twists should consist either of a single half-twist or an odd number of half-twists, so that the spoke instead of continuing in a straight line to the rim, as shown at *h h*, after engaging with the other spoke returns to the same side of the joint that it belonged to at starting from the hub, as shown. By thus twisting the spokes they are firmly and securely held together at the point of crossing one another, and the tightening of a spoke by any strain put upon it cannot impair the joint. The joints after twisting may, if desired, be soldered or otherwise bound. In the drawing the spokes are also shown at *d* twisted together with a single half-twist for part of the inner circle of crossings near the hub; but it must be understood that the same remarks exactly apply to the twisting of the spokes here as those above mentioned concerning the outer circle of crossing at *b*, and, further, that these remarks also apply in the like manner to the twisting of any of the spokes at all or any of the remaining points of crossing, as may be desired. This mode of stiffening the wheel by intertwining the spokes is applicable to all kinds of wheels constructed with tangential or laced spokes, no matter for what purpose they are employed.

Having now particularly described and ascertained the nature of my said invention, and in what manner the same is to be performed, I declare that what I claim is—

In all kinds of tangent or laced wheels, the fastening of the spokes at all or any of the points of crossing by twisting or half-twisting them together, the joint thus made being, if desired, afterward soldered or otherwise bound.

In witness whereof I hereunto set my hand in presence of two witnesses.

CHARLES JAMES REYNOLDS.

Witnesses:
 WALTER S. BROMHEAD,
 ALEXANDER W. ALLEN.